June 11, 1929.　　　A. C. JUDD　　　1,716,524
ROD PACKING ELEMENT
Filed Jan. 5, 1924
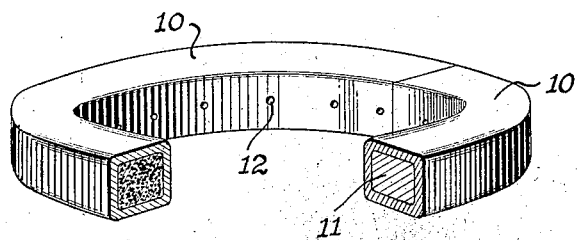
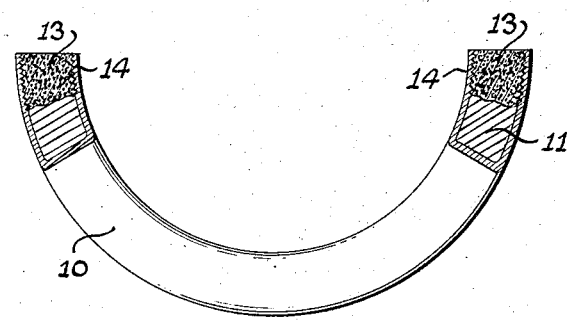
INVENTOR
Arthur C. Judd.
BY
Cooper, Kerr & Dunham
ATTORNEYS Patented June 11, 1929.

1,716,524

UNITED STATES PATENT OFFICE.

ARTHUR C. JUDD, OF NEW YORK, N. Y.

ROD-PACKING ELEMENT.

Application filed January 5, 1924. Serial No. 684,514.

A popular type of packing now in use for piston rods and the like consists of tubular rings of relatively soft metal containing plastic lubricant. These rings, preferably split for easy assembling, are placed around the rod in the stuffing box through which the rod moves and are held under suitable pressure by a gland. At least the inner surfaces of the rings are preferably cylindrical, to conform to the surface of the rod, and are provided with small openings through which the contained lubricant can exude as the rod slides back and forth through the packing. The ends of the ring-segments are closed to prevent escape of lubricant except through the openings mentioned. Heretofore the ends have been closed with fusible metal or alloy, as for example solder, deposited in the molten state in the open ends of the ring-segment. This method is costly, however, especially in the time required to make the closure, and the latter may soften or melt when the ring is used under conditions where high temperatures are encountered, as for example in steam engines using superheated steam. In such cases the fusible plugs are apt to melt and permit the lubricant to escape into the stuffing box, which in turn permits the tubular rings to collapse and pack themselves so tightly into the box under the pressure of the gland that they can be removed only with great difficulty. My present invention is designed to avoid these troubles, and to that end it provides non-metallic closures for the ends of the ring segments, capable of withstanding high temperatures and tough enough to resist without fracture the pressures incident to use of the rings in a stuffing box. The invention consists in the novel features hereinafter described.

In the accompanying drawing,

Fig. 1 is a perspective view, partly in section, of a packing ring embodying my invention.

Fig. 2 is a plan view, partly in section, of one of the segments shown in Fig. 1.

The tubular packing ring shown is composed of two segments, 10, made of relatively soft metal, as for example soft copper or a lead-antimony alloy. The segments contain plastic lubricant, indicated at 11, and are provided in their inner surface with small openings 12, of any suitable number, through which the lubricant can exude.

In the ends of the segments are non-metallic closures 13, of suitable composition. Preferably I use a mixture of powdered asbestos and a suitable binder, say what is known as "stove lining cement," as for example finely pulverized manganese binoxid mixed with a strong solution of soluble sodium silicate to form a thick paste. The proportions of the ingredients may vary, but a mixture of 30 parts powdered asbestos and 70 parts of the cement, with sufficient water to make a plastic mass of rather stiff consistency, has been found satisfactory. This mixture is packed tightly into the open ends of the tube to a depth of a quarter of an inch or so according to the size of the tube in cross section, and is smoothed off flush, after which it is allowed to harden. The closures or plugs thus formed are capable of withstanding temperatures far in excess of the melting point of the alloy of which the ring is made, and they adhere firmly to the inner surface of the tube. If necessary or desirable, the inner surface of the tube can be roughened, as for example by means of circumferential grooves, to provide additional security against dislodgment of the plugs in careless handling or under exceptionally severe conditions of use. Such grooves are indicated at 14. The plugs have a certain amount of toughness and are slightly compressible, and can resist, without cracking, the pressure exerted by the gland when the rings are in use in the stuffing box. Another important feature is that they have substantially the same coefficient of thermal expansion as the alloy commonly used for the tubes, so that they do not expand the relatively inelastic walls of the tube as the temperature rises, or shrink away from the walls and thus become loose as the temperature falls. Moreover, they can be applied to the ends of the tube in much less time than required to produce effective closures by means of solder, and the material of which they are composed is also cheaper than solder. An important economy in manufacture is thus attained.

It is to be understood that the invention is not limited to the specific details herein described. The composition preferably employed can be varied quantitatively, and in some cases the stove lining cement used as the binder can be replaced, at least in part, by a mixture of Portland cement and yellow clay, or Portland cement and black fire clay, etc. My experience is that yellow clay alone as a binder is less satisfactory.

I claim:

1. A packing element comprising a soft-metal tube containing lubricant and having its ends plugged with a non-metallic mixture containing powdered asebestos, and a cementitious ingredient.

2. A packing element comprising a soft-metal tube containing lubricant and having its ends plugged with a heat-resistant, adherent non-metallic composition, capable of withstanding pressure in a stuffing box without cracking, and having approximately the same coefficient of thermal expansion and contraction as the metal of the tube.

In testimony whereof I hereto affix my signature.

ARTHUR C. JUDD.